United States Patent

[11] 3,579,255

[72] Inventor Walter Kaiser
Mohrenacker, Germany
[21] Appl. No. 737,925
[22] Filed June 18, 1968
[45] Patented May 18, 1971
[73] Assignee International Standard Electric Corporation
New York, N.Y.
[32] Priority July 14, 1967
[33] Germany
[31] ST27136

[54] OUTGOING TRUNK CONNECTION FOR PABX
1 Claim, 1 Drawing Fig.

[52] U.S. Cl. ........................................ 179/18
[51] Int. Cl. ........................................ H04q 3/42
[50] Field of Search ........................................ 179/18.21, 27.52

[56] References Cited

UNITED STATES PATENTS 2,258,854 10/1941 Kuchley et al. ............... 179/18EA

*Primary Examiner*—William C. Cooper
*Attorneys*—C. Cornell Remsen, Jr., Walter J. Baum, Rayson P. Morrison, Percy P. Lantzy, J. Warren Whitesel and Delbert P. Warner

ABSTRACT: A central marker, connected to a PABX, supervises the busy condition of trunk junctors and external registers. If, in an internal register, a call for a trunk line has been detected and all the external registers are busy, but at least one trunk junctor is available, the marker restores the time control of the internal register. As soon thereafter as an external register becomes available, the marker is requested again and the trunk connection is initiated.

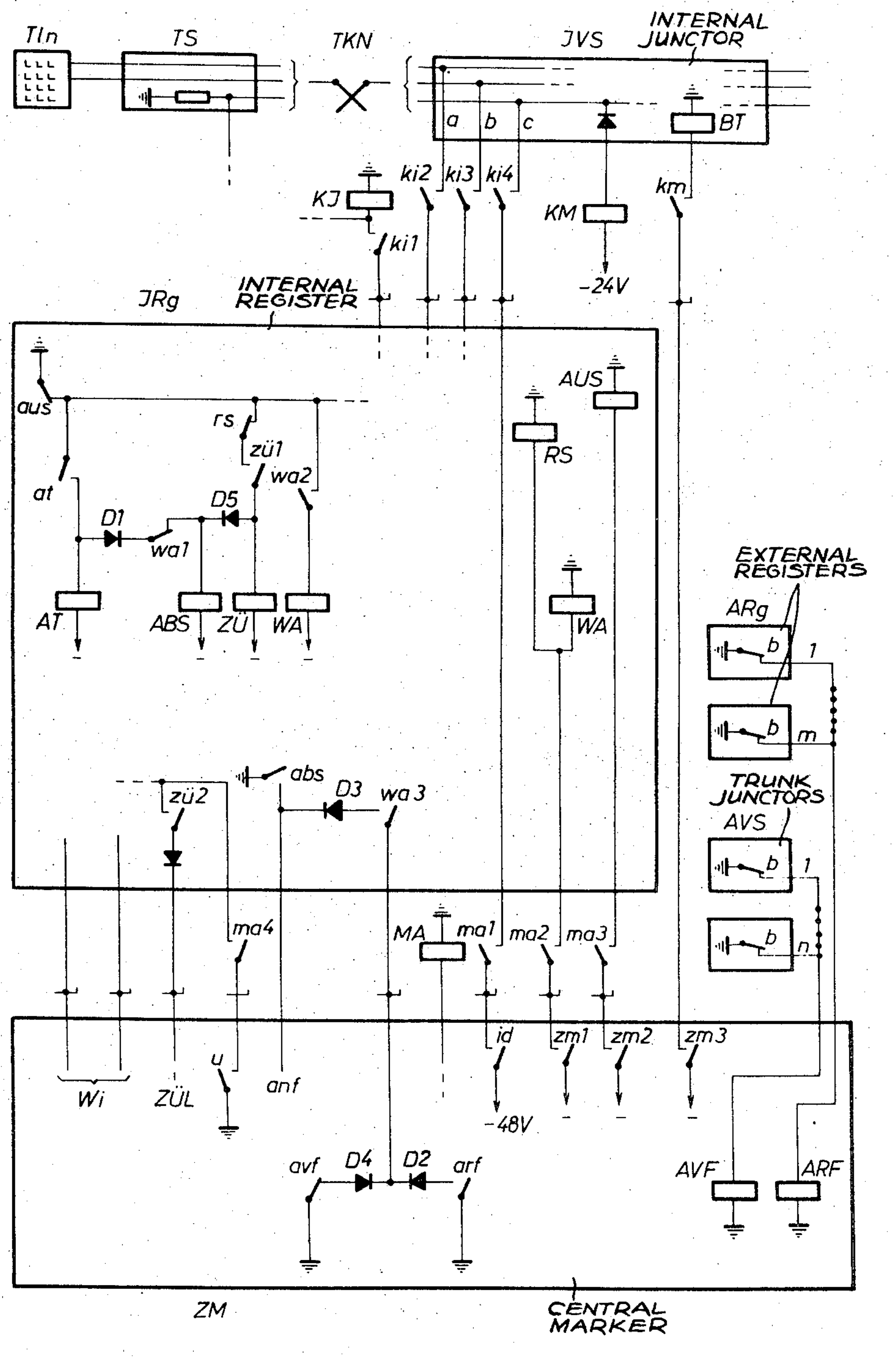
INVENTOR
WALTER KAISER
BY Delbert O. Warner
ATTORNEY

OUTGOING TRUNK CONNECTION FOR PABX

The invention relates to a circuit arrangement for private automatic branch exchanges equipped with registers and central markers. In such PABXs the internal connections between the extensions are established via internal junctors and the outgoing connections to trunk subscribers via trunk junctors. The trunk junctors are firmly associated to the trunk lines and may serve the terminating as well as the outgoing trunk traffic.

When the handset is lifted an internal junctor is seized and thereupon the subscriber or extension station receives proceed-to-dial tone. The internal register stores the arriving dial pulses and a trunk criterion is also recognized there (in most cases by pressing the ground button). In this case the change to a trunk junctor and an external register is necessary, in case a PABX extension with key dialling is concerned, wherein the dial criteria for the trunk traffic are converted in the external register into pulses. In PABX extensions equipped with dial switches such a conversion is not necessary, but a call number barring device is connected to the trunk junctor.

For connecting the call number barring device the same problems apply as for connecting the external register, consequently call number barring is not mentioned in any of the following cases.

In PABXs equipped with key dialling, an outgoing trunk connection can be established only if a trunk junctor and an external register are available. If not, switching from the internal junctor to the trunk junctor is not permitted.

It is known from the German application DAS 1,143,546 to make the switching over to the callback-side of a trunk junctor, depending on at least one internal junctor being available. It is the aim of this circuit arrangement to avoid that an extension, which has initiated a call-back but has not available an idle internal junctor cannot cancel the switching over in the trunk junctor. Quite a time may expire until an internal junctor becomes available and during this time the waiting public subscriber cannot be informed on the cause of the delay. In the circuit arrangement according to DAS 1,143,546 the desired connection can be established only if an internal junctor has become available.

It is an object of the invention to prevent losses in case of outgoing trunk connections which occur, if all external registers are seized although trunk junctors are still available. In contrast to the prior art, it is considered unacceptable for the present circuit arrangement to wait until a junctor becomes available. If however all external registers are seized, but at least a trunk junctor is still available, it may be properly assumed that within a defined period being approximately as long as the time control of the internal register, an external register will become available, because the external registers are seized for a shorter time than the junctors.

The circuit arrangement according to the invention is characterized in that means are provided in a central marker to supervise the busy condition of external registers and trunk junctors. The marker restores the time control to the seized internal register, after the marker has received an indication that a trunk is available to said internal register but that all external registers are seized. If at least one trunk junctor is idle then the central marker is disconnected, the central marker being again requested by the waiting internal register as soon as an external register becomes available. This circuit arrangement has the advantage that losses in outgoing trunk traffic can be reduced with little expenditure, in any case without increasing the number of the expensive external registers. In the same way, additional call number barring devices or increased losses may be avoided in PABXs wherein dialling into the public exchange is made via such call number barring devices. The disconnection of the internal register depends on the availability of the call number barring devices and eventually restores the time control of the internal register.

The invention is now in detail explained with the aid of the accompanying drawing showing only those parts of a key-dial-equipped PABX necessary to enable the reader to understand the basic ideas of the invention.

The extension T1*n* seizes an available internal junctor JVS by lifting the handset via an extension of subscriber connecting circuit TS and via a switching network TKN. An available internal register IR*g* is seized via a switching means KJ, functioning as a register connector. After seizing the internal register the extension receives proceed-to-dial tone and may commence dialling.

For dialling a public exchange subscriber, the extension initiates such a call e.g. by pressing the grounding button. This causes the "grounding" or "public exchange" key relay AT in the internal register JR*g* to pull up. Of said relay the drawing only shows the holding winding and the holding contact. Thereby the switch-off relay ABS responds in the following circuit (1):

(1) ground potential, *aus*, *at*, Dl, *wal*, ABS, negative potential.

By closing contact *abs* the central marker ZM is requested via the line *anf*. The central marker is connected via the cross-point relay MA. The central marker ZM interrogates the dial information with the aid of a contact *u* via the lines W*i*. Thereby the central marker determines that the extension T1*n* wants to initiate a trunk call. In key dialling systems a trunk call can be initiated only if an external register AR*g* as well as a trunk connector AVS are available. The central marker ZM constantly checks them on their busy condition. If e.g. all external registers l to *m* are seized all break-contacts *b* of the not shown seizing relays are open and the relay ARF in the central marker ZM drops. The same applies for the relay AVF which supervises the trunk junctors AVS on their busy condition.

If at least one trunk junctor and one external register is available the central marker applies —48 v. through contact *id* to the through-connected *c*-wire, said potential reaches the central marker again over its path via the internal register JR*g*, the internal junctor JVS, the subscriber switching network TKN and the subscriber circuit TS, thus enabling to identify the subscriber or extension position. Thereupon the central marker energizes through its contact *zm*2 the relay AUS in the internal register IR*g* and, in a way not shown, the internal junctor IVS and the connection in the subscriber switching network TKN is released. Thereupon the central marker initiates the trunk connection in a way known per se.

If no trunk junctors are available, the connection is lost independently of the busy or not busy condition of the external register. By the —48 v. identifying pulse via contact *id* the cross-point relay KM responds, connecting the internal junctor JVS to the central marker ZM. Said central marker causes the relay BT in the internal junctor JVS to respond through the marker contact *zm*3 via contact *km*., thereby the extension T1*n* receives busy tone from the internal junctor JVS. With the response of relay AUS in the internal register IR*g* only said internal register is released and the remaining connection is controlled further by the internal junctor JVS.

If, however, trunk junctors AVS are available, but all external registers AR*g* are seized the extension T1*n* may wait at a further connected internal register IR*g* for a predetermined time until an external register becomes available. Because the seizing time of an external register is short, the loss in outgoing trunk connections can be considerably reduced without the use of additional external registers.

The internal register IR*g* is thereby brought into waiting position so that the central marker ZM causes the relays RS and WA in the internal register IR*g* to respond, after interrogating the dial information with the contact *zm*1. Relay RS restores through its break-contact *rs* the time control which may consist e.g. of a relay counting chain. Thus the internal register IR*g* is again available for the extension T1*n* during a complete switch-off period (approximately 15 seconds). Relay WA is held through its holding winding via contact *wa*2.

By opening of the break-contact *wa*1 relay ABS is deenergized, the request of the central marker ZM is thereby interrupted and said central marker is switched off.

If an external register becomes available the central marker is requested again via the line *anf*, being inserted into the following circuit (2):

(2) ground potential, (ZM), *arf*, D2, *wa*3, D3, *anf*...

The central marker ZM is again actuated via the cross-point relay MA, the dial information is interrogated once more, the extension T1*n* is identified, the internal connection is released and thereupon the trunk connection is established.

If during the waiting period the last available trunk junctor is seized, relay AVF in the central marker drops. This may occur e.g. if the last available trunk line has been seized in the terminating direction. The central marker ZM is requested in the following circuit (3):

(3) ground potential (ZM), *avf*, D4, *wa*3, D3, *anf*....

The connection is then lost in the same way as if all trunk junctors had been seized at the beginning.

If, after restoring the time control in the internal register during the switch-off period of said internal register, no external register becomes available the time control ZU in said internal register responds. Relay ZU causes relay ABS to pull up in the following circuit (4):

(4) ground potential (IR*g*), *aus*, *rs*, *zul*, D5, ABS, negative potential.

The central marker ZM is again requested via contact *abs*. When interrogating the dial information the central marker ZM determines via the line ZUL that in the internal register the time control has responded. The connection is lost in the same way as if all trunk junctors would have been seized.

While the principles of the invention have been described above in connection with specific apparatus and applications, it is to be understood that this description is made only by way of example and not as a limitation on the scope of the invention.

I claim:

1. A circuit arrangement for connecting private automatic branch exchanges to external registers and trunk junctors comprising:
- a central marker,
- external registers,
- trunk junctors,
- switching means arranged in the central marker to supervise the busy condition of the external registers and the trunk junctors,
- an internal register associated with said private automatic branch exchange,
- means in said central marker for applying time control to said internal register responsive to determinations by said switching means that said external registers are busy and at least one trunk junctor is idle,
- means in the internal register for disconnecting the central marker when time control is applied to the internal register, and
- means associated with said internal register to request the central marker as soon as the switching means in the central marker provides an indication to the internal register that an external register has become available.